Jan. 29, 1957 W. N. HAUSSER 2,779,335
SELF-RETAINING CATTLE TROCAR
Filed May 13, 1955
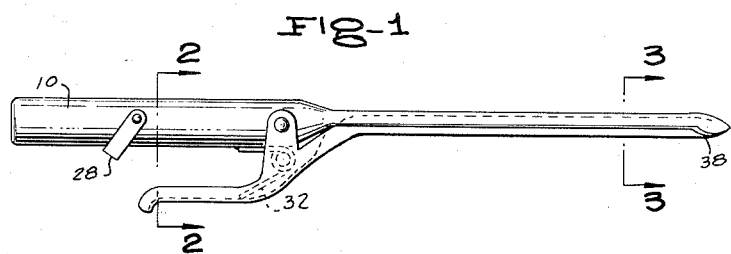
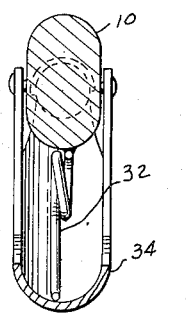
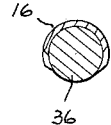
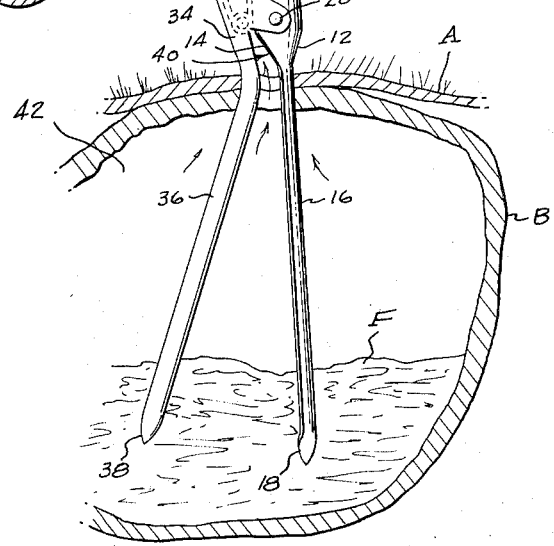
INVENTOR.
WILL N. HAUSSER
BY
McMorrow, Berman & Davidson
ATTORNEYS United States Patent Office 2,779,335
Patented Jan. 29, 1957

2,779,335

SELF-RETAINING CATTLE TROCAR

Will N. Hausser, Sidney, Ill.

Application May 13, 1955, Serial No. 508,168

3 Claims. (Cl. 128—347)

This invention relates to a trocar, particularly adapted to facilitate the "tapping" of bloated cattle, that is, the relieving of accumulated gases from the animal's stomach.

It is common practice to insert a trocar through the wall of the stomach of a bloated cow, for the purpose of permitting accumulated gases to flow therefrom. Heretofore, this operation has not been practiced with full efficiency, since in many instances food blocks the opening into the trocar, preventing the relief of the gases. Further, it is difficult to maintain the trocar in proper position during the operation.

The main object of the present invention is to provide a generally improved trocar, which will be so designed as to be self-retaining when in open position, thus to keep open the gas outlet throughout the use of the trocar.

Another object is to insure that the space through which the gas is to flow out of the stomach will be so disposed as to prevent obstruction of the outlet opening by food. When a conventional trocar is used, the inlet into the trocar is disposed well inwardly from the wall of the stomach, and hence is located in the area in which food may clog the same.

Another object is to provide a trocar which will be particularly adapted to facilitate its insertion or removal, and will be usable with speed and ease.

Other objects will appear from the following description, the claims appended thereto, and from the annexed drawing, in which like reference characters designate like parts throughout the several views, and wherein:

Figure 1 is a side elevational view of a trocar formed according to the present invention;

Figure 2 is an enlarged transverse section on line 2—2 of Figure 1;

Figure 3 is an enlarged transverse section on line 3—3 of Figure 1; and

Figure 4 is a side elevational view of the trocar in use, the trocar being shown in open position inserted in a cow's stomach.

The trocar constituting the present invention includes a main handle 10 of cylindrical formation, said handle being formed integrally at its inner end with a sharply tapered portion 12 defining an inclined surface on one side of the handle. Integral with the portion 12, at the smaller end thereof, is an elongated, straight perforator blade member 16, which as shown in Figure 3 is of channeled cross section throughout its length, said blade being formed at one end with a pointed tip 18 to facilitate insertion in the stomach B of the animal.

A pivot pin 20, extending transversely of handle 10 adjacent the larger end of portion 12, passes through ears 22 embracing the handle 10 between them, and said ears are integral with a second handle 24 having an outwardly curved free end 26 engageable with a pivoted retaining loop 28, that is pivotally connected to handle 10 by a pin 30. Handle 24 is normally biased outwardly from handle 10 to the position thereof shown in Figure 1, by a spring 32.

At its inner end, the handle 24 is integral with an angular extension 34, disposed at a wide obtuse angle to the handle 24, and said extension 34 in turn merges into a second perforator blade member 36 of cylindrical cross section, to interfit with the blade 16 when the blades are in longitudinal contact for insertion or removal. A pointed tip 38 is provided on the free end of blade 36, interfitting with the tip 18.

When the handles are in the position shown in Figure 1, the tool is ready for insertion in the stomach B of the cow. The skin A of the cow is punctured, and the tool inserted up to the inner ends of the perforator blade members. Then, the handles are pressed toward one another and the retaining loop 28 engaged over the free end of handle 24. This spreads the perforator blades 16, 36 into an acute angular relationship, and due to the particular formation of the inclined surface 14 and the angular extension 34 in relation to the longitudinal center line of the handle 10 and blade 16, there will be defined an outlet space 40 therebetween, at the convergent ends of the perforator blade members. The space is disposed in communication with the stomach cavity, due to the spreading of the perforator blades at the inner ends thereof.

It will be seen that the food F disposed within the stomach cavity will be disposed a substantial distance away from the space 40, and, as will be understood, the gases will be disposed in a space 42 above the food. This space is in full communication with the space 40, and accordingly, the gases will flow freely out of the puncture made in the skin A, through space 40 to atmosphere. No possibility exists of the food clogging the opening, due to the particular formation and relative arrangement of the parts of the trocar.

While the gases are being discharged, the handles can be latched together by means of loop 28, to maintain the perforator blades in spread relationship and preserve the opening 40 throughout the operation. Subsequently, when all the gases have been expelled, the loop 28 is disengaged from handle 24, and spring 32 biases the handles to their spread relationship, thus causing the perforator blades to contact longitudinally with one another once again, to permit removal of the trocar.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A cattle trocar comprising a pair of pivotally connected handles, said handles being relatively swingable between first positions in contact with one another and second positions in which they are spread apart from one another, one of said handles having a tapered portion at one end and the other handle having an angular extension at the corresponding end spaced from said tapered portion when the handles are in contacting relation, to define between the handles a space through which gas may flow out of an animal's stomach; and elongated perforator blades rigidly secured to said tapered portion and angular extension respectively, said blades in the spread position of the handles being extended in longitudinal contact for insertion or removal from a cow's stomach and, in the second position of the handles, being spaced apart to open into communication with the stomach cavity the space between the tapered portion and angular extension of the handles, one of said blades being of channeled cross section, the other blade being of cylindrical cross section and interfitting with the first named blade in the longitudinally contacting positions of the blades.

2. A cattle trocar comprising a pair of pivotally connected handles, said handles being relatively swingable between first positions in contact with one another and second positions in which they are spread apart from one another, one of said handles having a tapered portion at one end and the other handle having an angular extension at the corresponding end spaced from said tapered portion when the handles are in contacting relation, to define between the handles a space through which gas may flow out of an animal's stomach; and elongated perforator blades rigidly secured to said tapered portion and angular extension respectively, said blades in the spread position of the handles being extended in longitudinal position of the handles being extended in longitudinal contact for insertion or removal from a cow's stomach and, in the second position of the handles, being spaced apart to open into communication with the stomach cavity the space between the tapered portion and angular extension of the handles, one of said blades being of channeled cross section, the other blade being of cylindrical cross section and interfitting with the first named blade in the longitudinally contacting positions of the blades, and spring means interposed between the handles normally urging the handles to their spread position.

3. A cattle trocar comprising a pair of pivotally connected handles, said handles being relatively swingable between first positions in contact with one another and second positions in which they are spread apart from one another, one of said handles having a tapered portion at one end and the other handle having an angular extension at the corresponding end spaced from said tapered portion when the handles are in contacting relation, to define between the handles a space through which gas may flow out of an animal's stomach; and elongated perforator blades rigidly secured to said tapered portion and angular extension respectively, said blades in the spread position of the handles being extended in longitudinal contact for insertion or removal from a cow's stomach and, in the second position of the handles, being spaced apart to open into communication with the stomach cavity the space between the tapered portion and angular extension of the handles, one of said blades being of channeled cross section, the other blade being of cylindrical cross section and interfitting with the first named blade in the longitudinally contacting positions of the blades, and spring means interposed between the handles normally urging the handles to their spread position, one of the handles including a pivoted retaining loop adapted to engage the other handle in the contacting positions of the handles, to retain the perforator blades in spread position to maintain between the tapered portion and angular extension said outlet space for gases.

References Cited in the file of this patent

UNITED STATES PATENTS 1,060,440   Ehrlich _____ Apr. 29, 1913